UNITED STATES PATENT OFFICE.

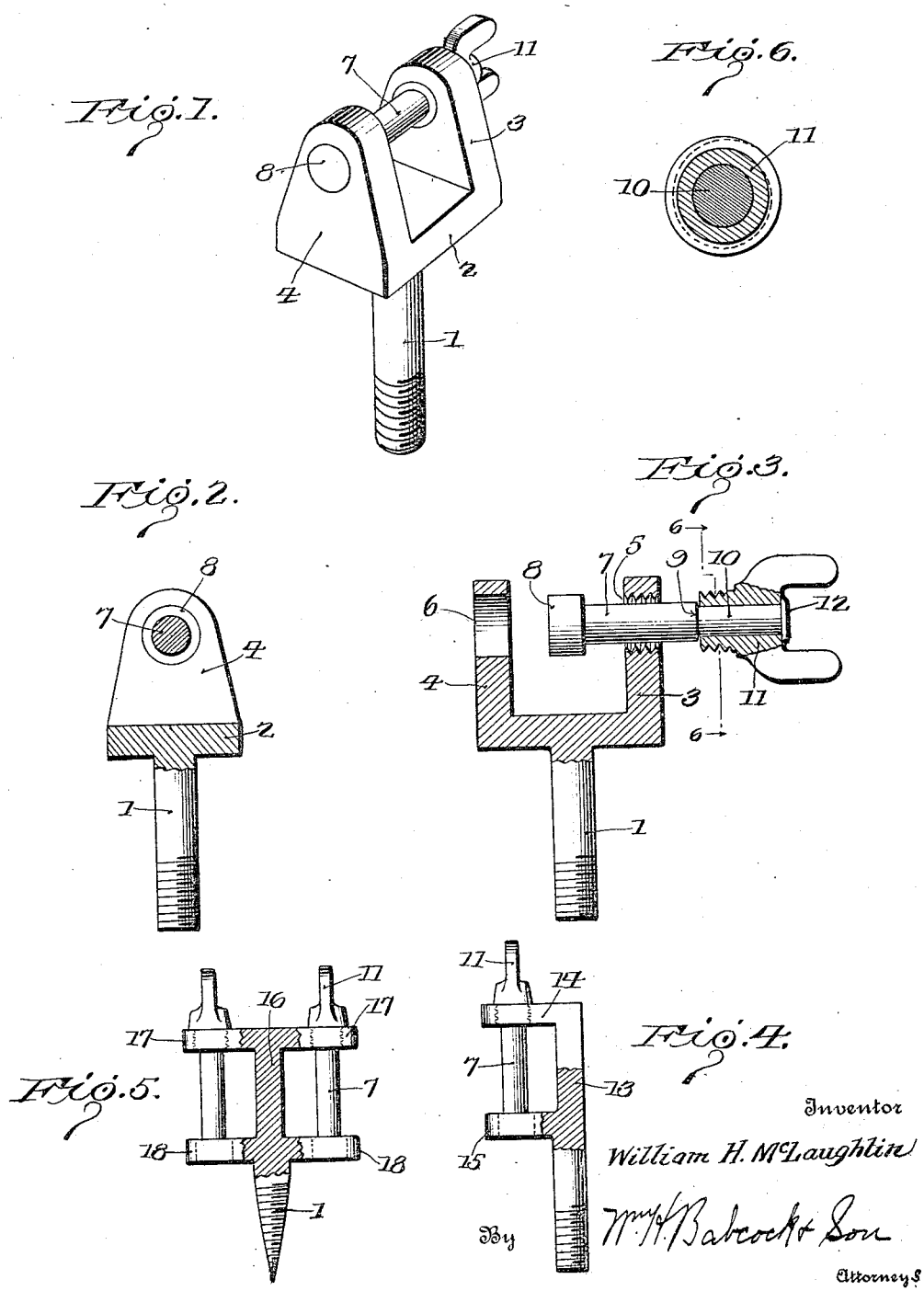

WILLIAM H. McLAUGHLIN, OF HARTFORD, CONNECTICUT, ASSIGNOR TO CASSIUS S. CHASE, OF HARTFORD, CONNECTICUT.

BOLT, SCREW, AND THE LIKE.

1,281,986.  Specification of Letters Patent.  Patented Oct. 15, 1918.

Application filed March 26, 1918. Serial No. 224,773.

*To all whom it may concern:*

Be it known that I, WILLIAM H. Mc-LAUGHLIN, a citizen of the United States, residing at Hartford, in the county of Hartford and State of Connecticut, have invented certain new and useful Improvements in Bolts, Screws, and the like, of which the following is a specification.

This invention relates to bolts, screws and the like and resides more particularly in the special construction of the heads thereof when combined with a pin or supplemental bolt or other part or parts working therein and is intended for use wherever it is desired to anchor or connect the end or ends of some chain, rope or other flexible or inflexible part or parts. The use primarily in view by applicant is to fasten the two plates of a clamp together on a spoke and to hold the end or ends of an anti-skidding chain, or chains, of the anchored type, in its head; or to be threaded into the felly of the wheel radially of the wheel and to anchor the end or ends of one or more anti-skidding chain or chains.

It has for its primary object to reduce the number of parts by making the bolt and anchoring means as a single part or unit, to guard against loss of parts by forming the parts in such manner that the pin cannot become accidentally separated from the head of the bolt, to provide a device which will surely be locked and yet which may be easily opened and also to provide such a device in which the anchoring pin, while locked against longitudinal movement, is free to rotate idly, thus distributing the wear equally on all faces of the pin, all of which objects, among others, are accomplished by the construction, combination and arrangements of parts, all as hereinafter more particularly set forth, described and claimed.

In the accompanying drawings:

Figure 1 represents a perspective view of a bolt embodying my invention;

Fig. 2, a vertical cross-sectional view of the same, the shank being shown partly in section and mostly in side elevation;

Fig. 3, represents a vertical longitudinal sectional view of the same similar to Fig. 2, illustrating clearly the difference in the diameter of the hole 6 and perforation 5;

Fig. 4, represents a side elevation, partly sectioned of a modification;

Fig. 5, represents a similar view of a further modification; and

Fig. 6 represents a detail sectional view on an enlarged scale on line 6—6 of Fig. 3.

Referring now in detail to the drawings, the shank 1 is preferably externally screwthreaded and provided with an enlarged head 2 extending transversely of the shank 1 and preferably on opposite sides thereof and is provided with lugs 3 and 4. The plate 2 is preferably arranged at right angles to the shank 1 and the lugs 3 and 4 are preferably arranged at right angles to the plate 2 and preferably parallel to each other, all elements or parts thus far described being preferably integral.

The lug 3 is provided with an internally screw threaded perforation 5 and the lug 4 is provided with a hole 6 having a larger diameter than the diameter of perforation 5. The perforation 5 and hole 6 preferably have a common axis.

A pin 7 having a large collar 8 on one end portion, which collar is preferably, though not necessarily formed integral with the pin, has its other end shouldered at 9 and a reduced stem 10 extending beyond said shoulder is adapted to receive a locking nut 11, which nut is provided with a tapering thread which engages in the thread of the perforation 5 and binds as the nut is turned home, locking the nut against turning by vibration etc. After this locking nut 11 is slipped on the part 10 the extreme end of this part is to be upset as at 12, preventing the separation of nut 11 from the pin and also providing a surface for the nut to act on when being loosened, to pull the pin longitudinally out of hole 6.

In assembling the pin is inserted through hole 6, inserting the stem 10 first. The collar 8 is of such dimensions that it will just pass through hole 6 and can turn therein.

but cannot pass through the smaller perforation 5. When the pin 7 has been thus inserted, with its stem 10 protruding beyond perforation 5 the nut 11 is slipped on said stem 10 and the extreme end thereof is upset as at 12 as above described for the purposes above mentioned.

In operation, the nut 11 is turned out and engages the upset part 12 and acting thereon pulls the pin longitudinally out of normal position until the thread of the nut 11 is free of the thread of the wall of the perforation 5. The pin 7 can then be freely pulled out and the terminal link or links of the chain or other part or parts of the element or elements to be secured passed over the collar 8, when the pin 7 is to be shoved in until the thread of nut 11 engages the screw-thread in the wall of perforation 5, when said nut 11 is to be turned inward until its tapered thread binds, as above mentioned, thus anchoring the terminal part or parts of the element or elements to be anchored and leaving the pin 7 free to rotate to distribute the wear freely and equally over the face thereof.

In the modifications shown in Fig. 4 the shank 1 is provided with an axial extension 13 which has two lateral lugs 14 and 15, corresponding respectively to the lugs 3 and 4 of the preferred form and the pin 7 is arranged so that its axial line is parallel to the axial line of shank 1, otherwise the construction, assembly and operation is the same as in the preferred form.

In the modification shown in Fig. 5, the shank 1 is provided with an axial extension 16 and, preferably on diametrically opposite sides, with upper lugs 17 and lower lugs 18, corresponding respectively to the lugs 14 and 15 of the modification shown in Fig. 4. This provides two pair of lugs, each pair comprising an upper lug 17 and a lower lug 18 and a pin 7 is mounted in each pair of said lugs, so that this modification is the same as to assembly, construction and operation as the form shown in Fig. 4, excepting that the lugs and pin are duplicated, one on each side of the axial line of the shank 1. Also, in this form, the shank is pointed so that it may be readily turned into a wooden felly or other wooden object, but this may be done to the shanks 1 of both the other forms where desired and it is not essential that they be threaded.

Any suitable material may be used for any part.

Having thus described my invention, what I claim as new and desire to secure by Letters Patent is:

1. A bolt provided with two lugs, one having a hole and the other a smaller perforation, in combination with a pin having portions normally located in said hole and perforation respectively and provided with a portion which will pass through said hole, but which is too large to pass through said perforation, and locking means mounted on said pin and adapted to engage said perforated lug to lock said pin in normal position while leaving it free to rotate on its axis.

2. A screw-threaded device provided with two lugs, one having a hole and the other a smaller perforation, in combination with a pin having portions normally located in said hole and perforation respectively and provided with a portion which will pass through said hole, but which is too large to pass through said perforation, and locking means adapted to engage said pin and fixed part to lock said pin in normal position.

3. A bolt provided with two lugs, one having a hole and the other a smaller perforation, in combination with a pin having portions normally located in said hole and perforation respectively and provided with an enlarged part which will pass through said hole, but which is too large to pass through said perforation, and locking means mounted on said pin and adapted to engage a fixed part to lock said pin in normal position, said enlarged part preventing the removal of said pin in one direction from said perforated lug and said locking means preventing the removal of said pin from said perforated lug in the reverse direction so long as said locking means are mounted on said pin.

4. A bolt provided with two parts fixedly mounted with relation to, and at an interval from, each other, in combination with a third part normally lying transversely thereof, means for locking said third part in normal position, said means being so formed as to prevent the disconnection of said third part from one of said first mentioned parts so long as said means remains on said third part, said latter part being intended to receive an endless article.

5. A screw-threaded device provided with two parts fixedly mounted with relation to, and at an interval from, each other, in combination with a third part normally lying transversely thereof, means for locking said third part in normal position while leaving it free to rotate on its axis, said means also preventing the disconnection of said third part from one of said first mentioned parts so long as said means remains on said third part.

6. A screw-threaded device provided with two parts fixedly mounted with relation to, and at an interval from, each other, one of said parts being provided with a screw-threaded perforation in combination with a third part lying transversely of said parts and having a portion located in said perforation, and a locking nut provided with an external tapering thread which is adapted to engage the thread of the wall of said perforation and bind therein, the other part of said screw-threaded device being provided with means to receive a portion of said pin, which portion is of greater dimensions in one direction than the diameter of said screw-threaded perforation.

In testimony whereof, I have signed my name to this specification in the presence of the subscribing witness.

WILLIAM H. McLAUGHLIN.

Witness:
SAM'L W. COCKRELL.

Copies of this patent may be obtained for five cents each, by addressing the "Commissioner of Patents, Washington, D. C."